US012593256B2

(12) United States Patent
Vivanco

(10) Patent No.: US 12,593,256 B2
(45) Date of Patent: Mar. 31, 2026

(54) CELL SELECTION FOR UNCREWED AERIAL VEHICLE COMMAND AND CONTROL LINK RELIABILITY OVER CELLULAR NETWORKS

(71) Applicant: AT&T Technical Services Company, Inc., Vienna, VA (US)

(72) Inventor: Daniel Vivanco, Ashburn, VA (US)

(73) Assignee: AT&T Technical Services Company, Inc., Vienna, VA (US)

( * ) Notice: Subject to any disclaimer, the term of this patent is extended or adjusted under 35 U.S.C. 154(b) by 359 days.

(21) Appl. No.: 18/471,248

(22) Filed: Sep. 20, 2023

(65) Prior Publication Data

US 2025/0097796 A1     Mar. 20, 2025

(51) Int. Cl.
| | |
|---|---|
| *H04W 36/00* | (2009.01) |
| *H04B 7/185* | (2006.01) |
| *H04W 36/08* | (2009.01) |
| *H04W 36/30* | (2009.01) |

(52) U.S. Cl.
CPC ........ *H04W 36/08* (2013.01); *H04B 7/18506* (2013.01); *H04W 36/304* (2023.05)

(58) Field of Classification Search
CPC . H04W 36/08; H04W 36/304; H04B 7/18506
USPC ........................................................ 370/331
See application file for complete search history.

(56) References Cited

U.S. PATENT DOCUMENTS

| | | | | | |
|---|---|---|---|---|---|
| 9,311,820 | B2 * | 4/2016 | Batla | ........................ | G08G 5/34 |
| 9,334,052 | B2 * | 5/2016 | Pasko | .................. | G05D 1/0005 |
| 9,412,279 | B2 * | 8/2016 | Kantor | ...................... | G08G 5/74 |
| 9,516,651 | B2 * | 12/2016 | Boström | .............. | H04L 5/0092 |
| 9,569,972 | B2 * | 2/2017 | Pasko | ........................ | G08G 5/57 |
| 9,583,006 | B2 * | 2/2017 | Srivastava | ............... | G08G 5/55 |
| 9,655,121 | B2 * | 5/2017 | Kim | ...................... | H04W 88/02 |
| 9,875,454 | B2 * | 1/2018 | Kantor | ................. | G06Q 10/083 |
| 9,894,602 | B1 * | 2/2018 | Manchanda | ........ | H04W 56/001 |
| 10,380,900 | B2 * | 8/2019 | Batla | ..................... | G05D 1/106 |
| 11,102,728 | B2 * | 8/2021 | Zhang | ................. | H04W 52/242 |
| 11,230,377 | B2 * | 1/2022 | Srivastava | ............. | G05D 1/106 |

(Continued)

OTHER PUBLICATIONS

N. Hosseini, H. Jamal, J. Haque, T. Magesacher and D. W. Matolak, "UAV Command and Control, Navigation and Surveillance: A Review of Potential 5G and Satellite Systems," 2019 IEEE Aerospace Conference, Big Sky, MT, USA, 2019, pp. 1-10.

*Primary Examiner* — Amancio Gonzalez

(57) ABSTRACT

A processing system deployed in a cellular network may detect capability information of an uncrewed aerial vehicle, the capability information including carrier aggregation capability information, where the uncrewed aerial vehicle includes at least one cellular radio for communication with the cellular network, select, in accordance with the carrier aggregation capability information, a primary cell of the cellular network to serve the uncrewed aerial vehicle, where the selecting comprises selecting the primary cell from among a plurality of cells within a communication range of the uncrewed aerial vehicle based on the primary cell having a largest coverage range for the uncrewed aerial vehicle as compared to other cells, and transmit at least a first instruction to assign at least a first portion of data traffic of the uncrewed aerial vehicle to the primary cell, the at least the first portion of the data traffic comprising command and control traffic.

20 Claims, 4 Drawing Sheets

(56)         References Cited

U.S. PATENT DOCUMENTS

| | | | | |
|---|---|---|---|---|
| 11,956,074 | B2 * | 4/2024 | Xu ......................... | H04W 72/21 |
| 12,219,582 | B2 * | 2/2025 | Singh ................ | H04W 28/0268 |
| 12,407,457 | B2 * | 9/2025 | Balasubramanian ... | H04L 5/001 |
| 12,432,733 | B2 * | 9/2025 | Ji .......................... | H04L 5/0035 |
| 2015/0087315 | A1 | 3/2015 | Lu et al. | |
| 2016/0189101 | A1 * | 6/2016 | Kantor .................... | G08G 5/55 |
| | | | | 705/338 |
| 2023/0171631 | A1 * | 6/2023 | Wang ................... | H04L 5/0098 |
| | | | | 370/329 |
| 2024/0357440 | A1 * | 10/2024 | Zhang ............ | H04W 36/00692 |
| 2024/0373314 | A1 * | 11/2024 | Sha ......................... | H04W 8/22 |
| 2025/0275006 | A1 * | 8/2025 | Hong ................... | H04W 76/19 |

* cited by examiner

200

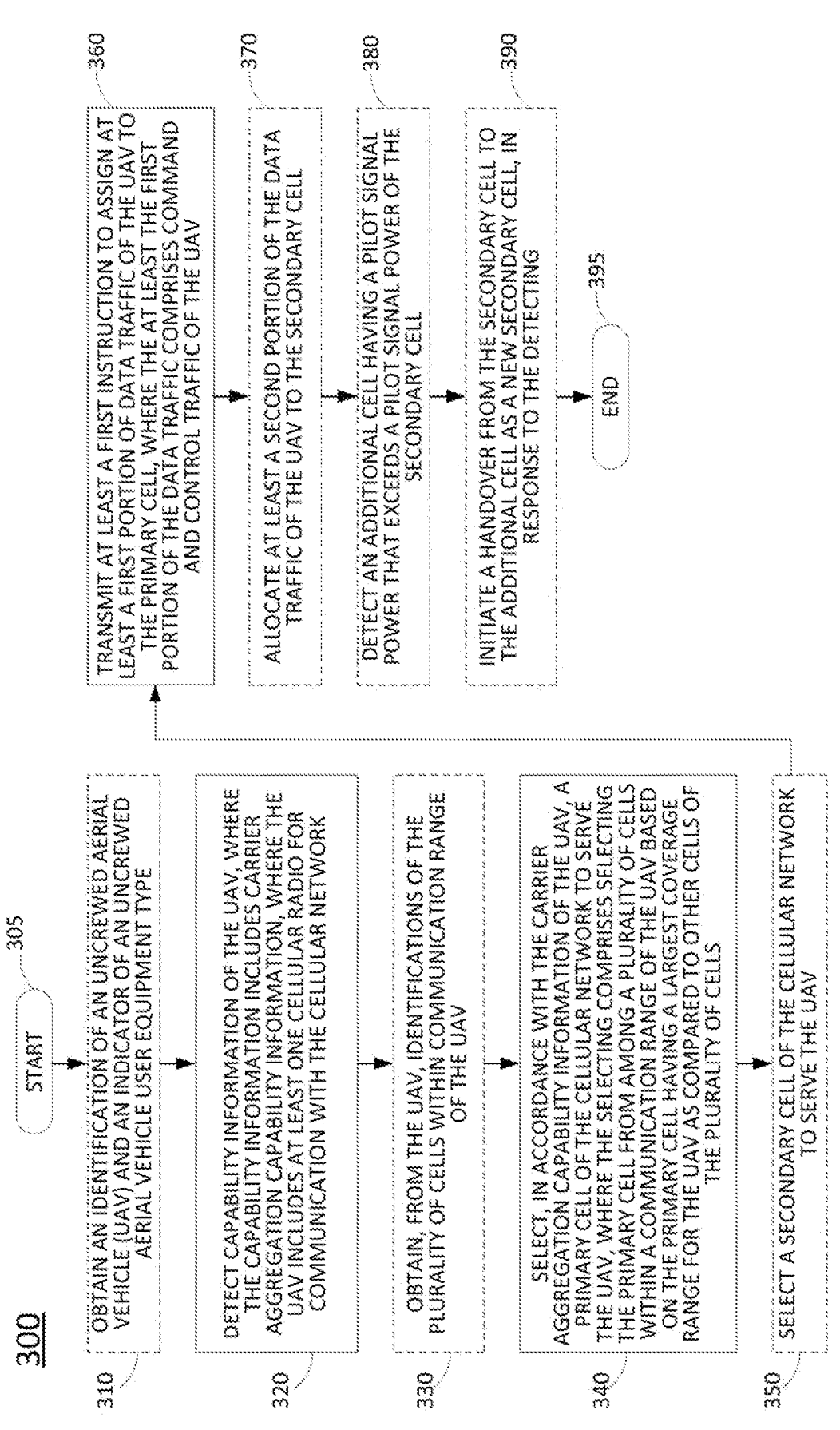

START 305

310 OBTAIN AN IDENTIFICATION OF AN UNCREWED AERIAL VEHICLE (UAV) AND AN INDICATOR OF AN UNCREWED AERIAL VEHICLE USER EQUIPMENT TYPE

320 DETECT CAPABILITY INFORMATION OF THE UAV, WHERE THE CAPABILITY INFORMATION INCLUDES CARRIER AGGREGATION CAPABILITY INFORMATION, WHERE THE UAV INCLUDES AT LEAST ONE CELLULAR RADIO FOR COMMUNICATION WITH THE CELLULAR NETWORK

330 OBTAIN, FROM THE UAV, IDENTIFICATIONS OF THE PLURALITY OF CELLS WITHIN COMMUNICATION RANGE OF THE UAV

340 SELECT, IN ACCORDANCE WITH THE CARRIER AGGREGATION CAPABILITY INFORMATION OF THE UAV, A PRIMARY CELL OF THE CELLULAR NETWORK TO SERVE THE UAV, WHERE THE SELECTING COMPRISES SELECTING THE PRIMARY CELL FROM AMONG A PLURALITY OF CELLS WITHIN A COMMUNICATION RANGE OF THE UAV BASED ON THE PRIMARY CELL HAVING A LARGEST COVERAGE RANGE FOR THE UAV AS COMPARED TO OTHER CELLS OF THE PLURALITY OF CELLS

350 SELECT A SECONDARY CELL OF THE CELLULAR NETWORK TO SERVE THE UAV

360 TRANSMIT AT LEAST A FIRST INSTRUCTION TO ASSIGN AT LEAST A FIRST PORTION OF DATA TRAFFIC OF THE UAV TO THE PRIMARY CELL, WHERE THE AT LEAST THE FIRST PORTION OF THE DATA TRAFFIC COMPRISES COMMAND AND CONTROL TRAFFIC OF THE UAV

370 ALLOCATE AT LEAST A SECOND PORTION OF THE DATA TRAFFIC OF THE UAV TO THE SECONDARY CELL

380 DETECT AN ADDITIONAL CELL HAVING A PILOT SIGNAL POWER THAT EXCEEDS A PILOT SIGNAL POWER OF THE SECONDARY CELL

390 INITIATE A HANDOVER FROM THE SECONDARY CELL TO THE ADDITIONAL CELL AS A NEW SECONDARY CELL, IN RESPONSE TO THE DETECTING

END 395

400

CELL SELECTION FOR UNCREWED AERIAL VEHICLE COMMAND AND CONTROL LINK RELIABILITY OVER CELLULAR NETWORKS

The present disclosure relates generally to cellular networks, and more particularly to methods, non-transitory computer-readable media, and apparatuses for assigning at least a first portion of a data traffic of an uncrewed aerial vehicle comprising command and control traffic to a primary cell of the cellular network that is selected based on the primary cell having a largest coverage range for the uncrewed aerial vehicle as compared to other available cells.

BACKGROUND

Current trends in wireless technology are leading towards a future where virtually any object can be network-enabled and addressable on-network. The pervasive presence of cellular and non-cellular wireless networks, including fixed, ad-hoc, and/or or peer-to-peer wireless networks, satellite networks, and the like along with the migration to a 128-bit IPv6-based address space provides the tools and resources for the paradigm of the Internet of Things (IoT) to become a reality. In addition, drones or autonomous aerial vehicles (AAVs) are increasingly being utilized for a variety of commercial and other useful tasks, such as package deliveries, search and rescue, mapping, surveying, and so forth, enabled at least in part by these wireless communication technologies.

SUMMARY

In one example, the present disclosure discloses a method, computer-readable medium, and apparatus for assigning at least a first portion of data traffic of an uncrewed aerial vehicle comprising command and control traffic to a primary cell of the cellular network that is selected based on the primary cell having a largest coverage range for the uncrewed aerial vehicle as compared to other available cells. For example, a processing system including at least one processor deployed in a cellular network may detect capability information of an uncrewed aerial vehicle, where the capability information includes carrier aggregation capability information, and where the uncrewed aerial vehicle includes at least one cellular radio for communication with the cellular network. The processing system may next select, in accordance with the carrier aggregation capability information of the uncrewed aerial vehicle, a primary cell of the cellular network to serve the uncrewed aerial vehicle, where the selecting comprises selecting the primary cell from among a plurality of cells within communication range of the uncrewed aerial vehicle based on the primary cell having a largest coverage range for the uncrewed aerial vehicle as compared to other cells of the plurality of cells. The processing system may then transmit at least a first instruction to assign at least a first portion of data traffic of the uncrewed aerial vehicle to the primary cell, where the at least the first portion of the data traffic comprises command and control traffic of the uncrewed aerial vehicle.

BRIEF DESCRIPTION OF THE DRAWINGS

The teachings of the present disclosure can be readily understood by considering the following detailed description in conjunction with the accompanying drawings, in which:

FIG. 3 illustrates a flowchart of an example method for assigning at least a first portion of data traffic of an uncrewed aerial vehicle comprising command and control traffic to a primary cell of the cellular network that is selected based on the primary cell having a largest coverage range for the uncrewed aerial vehicle as compared to other available cells.

To facilitate understanding, similar reference numerals have been used, where possible, to designate elements that are common to the figures.

DETAILED DESCRIPTION

Figure 1:
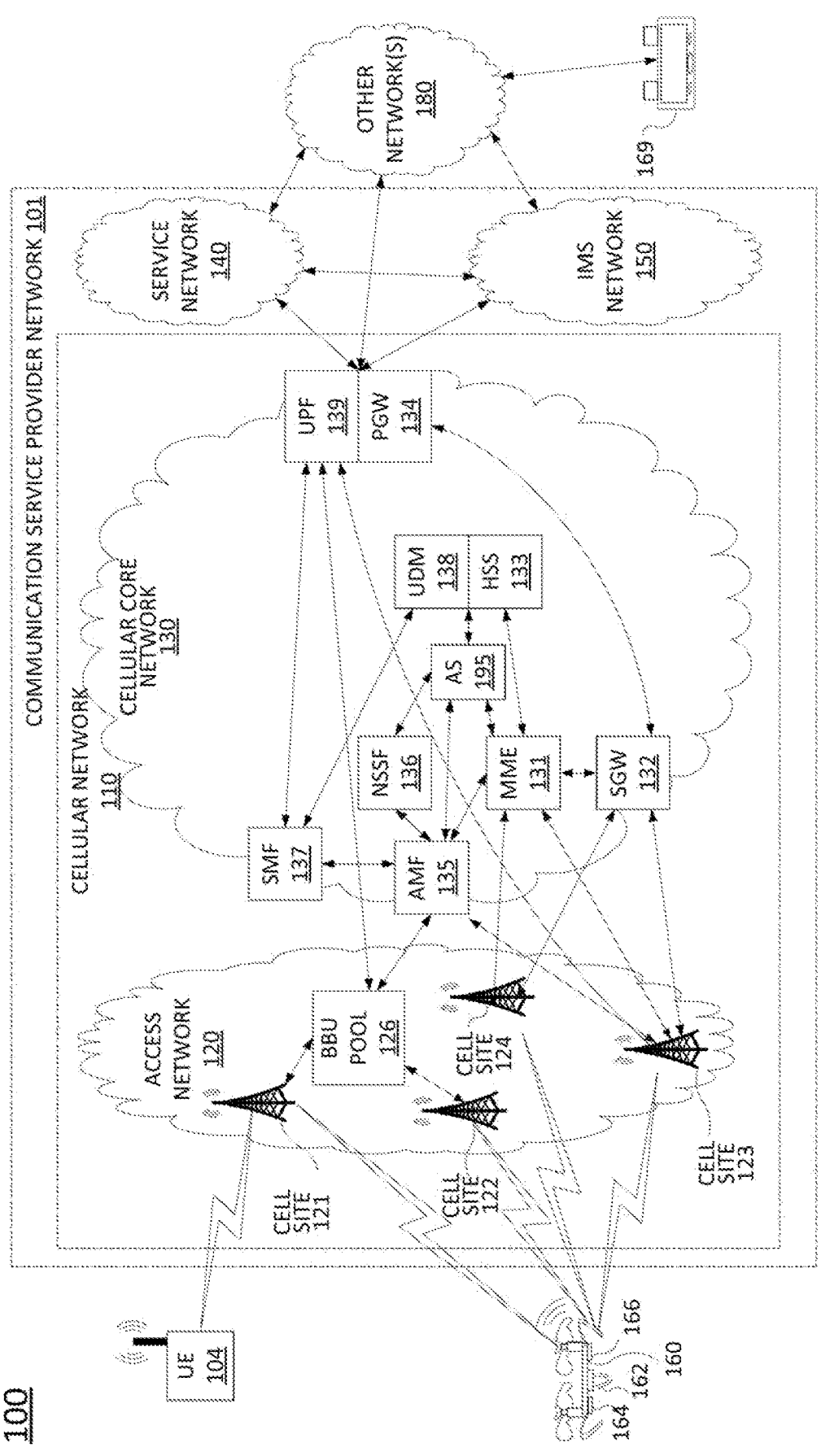
FIG. 1 illustrates a block diagram of an example system, in accordance with the present disclosure.

The present disclosure broadly discloses methods, non-transitory computer-readable media, and apparatuses for assigning at least a first portion of data traffic of an uncrewed aerial vehicle comprising command and control traffic to a primary cell of the cellular network that is selected based on the primary cell having a largest coverage range for the uncrewed aerial vehicle as compared to other available cells. In particular, use of commercial uncrewed aerial vehicles (UAVs) is growing rapidly, including for delivery of parcels or other items, presentation of media, inspection of critical infrastructure, surveillance, search-and-rescue operations, agriculture inspection and maintenance, and so forth. Many use cases of UAVs require beyond visual line-of-sight (LOS) communications. Mobile networks offer wide area, high speed, and secure wireless connectivity, which can enhance control and safety of UAV operations and enable beyond-visual LOS use cases. Existing LTE networks can support initial UAV deployments, while LTE evolution and 5G may provide more efficient connectivity for more wide-scale UAV deployments.

One challenge in using LTE networks for serving UAVs is the fact that mobile LTE networks are optimized for terrestrial broadband communication. In particular, base station antennas are typically down-tilted to reduce the interference power level to other cells. With down-tilted base station antennas, small UAVs may be served by the generated sidelobes. However, it should be noted that due to the presence of possible nulls in the sidelobes, and due to the close-to-free-space propagation in the sky, an aerial user equipment (e.g., a UAV) may detect several cell sites (e.g., eNodeBs and/or gNBs, or the like) in the area. In addition, an aerial UE may see a stronger signal from a faraway cell site than the one that is geographically closest. Hence, an aerial UE may be served by a more distant base station/cell site instead of the geographically closest one.

In accordance with the present disclosure, a UAV may use LTE/5G radio technologies to communicate with a ground station, e.g., a UAV control server or other devices. Communications between the UAV and the ground station relating to management and control of the UAV operations may be referred to as a command and control (C2) link. For instance, the C2 link allows an operator to navigate the UAV on a three dimensional trajectory, to understand the state of the UAV, and to control one or more components or accessories (such as to remotely orient a camera, to remotely activate warning lights, sirens, sensors, etc.). In general, the C2 link is used to control the UAV and to receive health and status information of UAV. In addition to C2 traffic, the UAV may also have a payload data link with the ground station, which is used to pass data that is considered non-critical to UAV operations, such as recorded audio or video, photo- graphs, sensor measurements unrelated to UAV navigation, etc. Since the C2 link carries navigation information that is time sensitive, packet loss and delay on C2 link can lead to catastrophic issues for the UAV or to third parties.

In accordance with the present disclosure, the C2 link for UAV is provided with a higher priority than payload data. In particular, examples of the present disclosure provide an inter-frequency carrier aggregation (CA) selection process that matches network available CA combinations against UAV capable CA combinations. In one example, the present disclosure may select an available cell/frequency with a large coverage for a UAV as a primary cell (PCell) and may select an available cell/frequency with a large bandwidth as a secondary cell (SSell). In addition, the present disclosure may map UAV C2 link traffic to the PCell and UAV payload data traffic to the SCell. To illustrate, in one example, a cellular network may collect UE capabilities and UE type. If the UE type is "aerial," the cellular network may then obtain UAV and terrestrial network CA capabilities, and may match allowed eNB/gNB CA combinations against UAV allowed CA combinations. It should be noted that UE capability information (including for UAV/aerial type UEs) may be sent in the uplink to a base station during a network attach process. This may include a current serving PCell to which a UAV may be attached.

In one example, the UAV's trajectory may be identified either from a navigation control service (e.g., from the ground station controlling the UAV), or estimated based on observations. In addition, coverage ranges and bandwidth of available cells that can provide wireless access to the UAV may be identified. The available cells may then be ranked based on coverage range and bandwidth. In one example, an available cell/frequency with the largest coverage may be selected as a primary cell (PCell) for the UAV and an available cell/frequency with a largest bandwidth may be selected as a secondary cell (SCell) for the UAV. To illus- trate, the following cells may be available: (a) cell 1 with a frequency of 800 MHz, an estimated range of 10 miles, and a bandwidth of 1 Mbps, (b) cell 2 with a frequency of 1.6 GHZ, an estimated range of 5 miles, and a bandwidth of 5 Mbps, and (c) cell 3 with a frequency of 5 GHZ, an estimated range of 1 mile, and a bandwidth of 100 Mbps. In this example, cell 1 may be selected as a primary cell and cell 3 may be selected as a secondary cell for the UAV.

Next, the UAV C2 link traffic may be mapped to the primary cell (e.g., cell 1) and UAV payload data traffic may be mapped to the secondary cell (e.g., cell 3). Notably, UVA C2 link traffic may have a low bandwidth demand (e.g., around 100 Kbps), but may demand high reliability (e.g., no drops or delays). As such, cell 1 with a large coverage, but low bandwidth carrier/frequency may be the best available candidate for C2 link traffic. Conversely, UAV payload data traffic may demand a large bandwidth (e.g., for high defi- nition video upload or the like), but may tolerate some packet drops and/or delays. As such, cell 3, with a smaller coverage but high bandwidth carrier/frequency may be the best candidate for UAV payload data traffic.

It should be noted that carrier aggregation aims to increase the collective bandwidth for a UE by aggregation of multiple carriers, and thereby increase the bitrate. Carrier aggregation can be used for both frequency division duplex (FDD) and time division duplex (TDD). When a UE and network engage in carrier aggregation, traffic for the UE is split into multiple carriers. These carriers can operate in the same frequency band (intra-frequency CA) or different frequency bands (inter-frequency CA). A UE may be assigned or permitted to use carrier aggregate for downlink traffic, uplink traffic, or both simultaneously. When aggre- gating carriers, the following may be taken into consider- ation: allowed 3rd Generation Partnership Project (3GPP) carrier aggregation bands combinations, available frequency bands in a given area, a maximum number of allowed component carriers (CC) supported by base stations and/or a UE, other UE carrier aggregation capabilities (such as frequency bands supported, maximum transmit power, dual connectivity capability), and so forth. To further illustrate, UEs may support different bands and support different 3GPP releases. In addition, different UEs may also have different CA capabilities. At the same time, wireless/cellular network operators may also have different frequency bands in which different component carriers may be made available, and which may support different 3GPP releases. In addition, cellular network operators may also provide for different bandwidth and available radio frequency (RF) resources within each carrier, which may also change throughout the day, by day of the week, seasonally, etc.

In LTE, when a UE attaches to an eNodeB, the UE reports supported CA band combinations to the eNodeB (e.g., a PCell) in the UECapabilityInformation message in response to a received UECapabilityEnquiry message. The PCell then decides whether and when to add SCell(s) based on signal quality perceived by the UE, frequency priority, and UE/eNodeB supported bands. In general, the UE attaches to a PCell and passes UE capabilities. The UE scans for other neighboring cells and reports the identified cells to the PCell. Next, the PCell selects an SCell for the UE from the reported neighboring cells based on UE capability, signal strength, and/or frequency priority. The PCell may then add a selected component carrier as an SCell for the UE. The UE may be directed to connect to the SCell, and data traffic may be split between the PCell and SCell. It should also be noted that multiple SCells may be added in various circumstances. In addition, the PCell and SCell may be of a same cell site/base station, or may be situated at different nearby cell sites.

In general, low frequency bands have longer range (e.g., 10 miles) compared to high frequency bands (e.g., 0.5 miles). It is expected that coverage range may be even longer for aerial UEs/UAVs than for terrestrial UEs, since waveforms may have better line of sight. At the same time, high frequency bands generally have higher bandwidth than lower frequencies, making higher frequency bands more suitable for high throughout applications (such as high- definition video, or the like). However, the approach of classic PCell and SCell carrier aggregation selection relies on signal power (e.g., reference signal received power (RSRP)) and does not take into consideration the unique UE capabilities, such as UAV C2 link demands. In accordance with the present disclosure, a cellular network may select multiple carriers/frequency combinations (component carri- ers) to split data traffic for a UAV supporting inter-frequency carrier aggregation. Thus, in accordance with the present disclosure a UAV can use a multi-carrier/frequency LTE/5G terrestrial network to differentially process C2 link and payload data, optimized to prioritize the C2 link traffic, where both the UAV and terrestrial network may support CA and multiple frequency bands, e.g., including low frequency bands (such as 800 MHZ) and high frequency bands (such as 5 GHZ). These and other aspects of the present disclosure are described in greater detail below in connection with the examples of FIGS. 1-4.

FIG. 1 illustrates an example network, or system 100 in which examples of the present disclosure may operate. In one example, the system 100 includes a communication service provider network 101. The communication service provider network 101 may comprise a cellular network 110 (e.g., a 5G network, a 4G/Long Term Evolution (LTE)/5G hybrid network, or the like), a service network 140, and an IP Multimedia Subsystem (IMS) network 150. The system 100 may further include other networks 180 connected to the communication service provider network 101.

In one example, the cellular network 110 comprises an access network 120 and a cellular core network 130. In one example, the access network 120 comprises a cloud RAN. For instance, a cloud RAN is part of the 3GPP 5G specifications for mobile networks. As part of the migration of cellular networks towards 5G, a cloud RAN may be coupled to an Evolved Packet Core (EPC) network until new cellular core networks are deployed in accordance with 5G specifications. In one example, access network 120 may include cell sites 121 and 122 and a baseband unit (BBU) pool 126. In a cloud RAN, radio frequency (RF) components, referred to as remote radio heads (RRHs) or radio units (RUs), may be deployed remotely from baseband units, e.g., atop cell site masts, buildings, and so forth. In one example, the BBU pool 126 may be located at distances as far as 20-80 kilometers or more away from the antennas/remote radio heads of cell sites 121 and 122 that are serviced by the BBU pool 126. It should also be noted in accordance with efforts to migrate to 5G networks, cell sites may be deployed with new antenna and radio infrastructures such as multiple input multiple output (MIMO) antennas, and millimeter wave antennas. In this regard, a cell, e.g., the footprint or coverage area of a cell site may in some instances be smaller than the coverage provided by NodeBs or eNodeBs of 3G-4G RAN infrastructure. For example, the coverage of a cell site utilizing one or more millimeter wave antennas may be 1000 feet or less.

Although cloud RAN infrastructure may include distributed RRHs and centralized baseband units, a heterogeneous network may include cell sites where RRH and BBU components remain co-located at the cell site. For instance, cell site 123 may include RRH and BBU components. Thus, cell site 123 may comprise a self-contained "base station." With regard to cell sites 121 and 122, the "base stations" may comprise RRHs at cell sites 121 and 122 coupled with respective baseband units of BBU pool 126. In one example, baseband unit functionality may be split into a centralized unit (CU) and a distributed unit (DU). In addition, the CU and the DU may be physically separate from one another. For instance, a DU may be situated with an RU/RRH at a cell site, while a CU may be in a centralized location hosting multiple CUs. Alternatively, or in addition, a single CU may serve multiple DUs and/or RUs/RRHs. In accordance with the present disclosure a "base station" may therefore comprise at least a BBU (e.g., in one example, a CU and/or a DU), and may further include at least one RRH/RU.

In accordance with the present disclosure, any one or more of cell sites 121-123 may be deployed with antenna and radio infrastructures, including multiple input multiple output (MIMO) and millimeter wave antennas. Furthermore, in accordance with the present disclosure, a base station (e.g., cell sites 121-123 and/or baseband units within BBU pool 126) may comprise all or a portion of a computing system, such as computing system 400 as depicted in FIG.

4, and may be configured to perform steps, functions, and/or operations in connection with examples of the present disclosure for assigning at least a first portion of data traffic of an uncrewed aerial vehicle comprising command and control traffic to a primary cell of the cellular network that is selected based on the primary cell having a largest coverage range for the uncrewed aerial vehicle as compared to other available cells.

In one example, access network 120 may include both 4G/LTE and 5G/NR radio access network infrastructure. For example, access network 120 may include cell site 124, which may comprise 4G/LTE base station equipment, e.g., an eNodeB. In addition, access network 120 may include cell sites comprising both 4G and 5G base station equipment, e.g., respective antennas, feed networks, baseband equipment, and so forth. For instance, cell site 123 may include both 4G and 5G base station equipment and corresponding connections to 4G and 5G components in cellular core network 130. Although access network 120 is illustrated as including both 4G and 5G components, in another example, 4G and 5G components may be considered to be contained within different access networks. Nevertheless, such different access networks may have a same wireless coverage area, or fully or partially overlapping coverage areas.

In one example, the cellular core network 130 provides various functions that support wireless services in the LTE environment. In one example, cellular core network 130 is an Internet Protocol (IP) packet core network that supports both real-time and non-real-time service delivery across a LTE network, e.g., as specified by the 3GPP standards. In one example, cell sites 121 and 122 in the access network 120 are in communication with the cellular core network 130 via baseband units in BBU pool 126.

In cellular core network 130, network devices such as Mobility Management Entity (MME) 131 and Serving Gateway (SGW) 132 support various functions as part of the cellular network 110. For example, MME 131 is the control node for LTE access network components, e.g., eNodeB aspects of cell sites 121-123. In one embodiment, MME 131 is responsible for UE (User Equipment) tracking and paging (e.g., such as retransmissions), bearer activation and deactivation process, selection of the SGW, and authentication of a user. In one embodiment, SGW 132 routes and forwards user data packets, while also acting as the mobility anchor for the user plane during inter-cell handovers and as an anchor for mobility between 5G, LTE and other wireless technologies, such as 2G and 3G wireless networks.

In addition, cellular core network 130 may comprise a Home Subscriber Server (HSS) 133 that contains subscription-related information (e.g., subscriber profiles), performs authentication and authorization of a wireless service user, and provides information about the subscriber's location. The cellular core network 130 may also comprise a packet data network (PDN) gateway (PGW) 134 which serves as a gateway that provides access between the cellular core network 130 and various packet data networks (PDNs), e.g., service network 140, IMS network 150, other network(s) 180, and the like.

The foregoing describes long term evolution (LTE) cellular core network components (e.g., EPC components). In accordance with the present disclosure, cellular core network 130 may further include other types of wireless network components e.g., 5G network components, 3G network components, etc. Thus, cellular core network 130 may comprise an integrated network, e.g., including any two or more of 2G-5G infrastructures and technologies (or any future infrastructures and technologies to be deployed, e.g., 6G), and the like. For example, as illustrated in FIG. 1, cellular core network 130 further comprises 5G components, including: an access and mobility management function (AMF) 135, a network slice selection function (NSSF) 136, a session management function (SMF) 137, a unified data management function (UDM) 138, and a user plane function (UPF) 139.

In one example, AMF 135 may perform registration management, connection management, endpoint device reachability management, mobility management, access authentication and authorization, security anchoring, security context management, coordination with non-5G components, e.g., MME 131, and so forth. NSSF 136 may select a network slice or network slices to serve an endpoint device, or may indicate one or more network slices that are permitted to be selected to serve an endpoint device. For instance, in one example, AMF 135 may query NSSF 136 for one or more network slices in response to a request from an endpoint device to establish a session to communicate with a PDN. The NSSF 136 may provide the selection to AMF 135, or may provide one or more permitted network slices to AMF 135, where AMF 135 may select the network slice from among the choices. A network slice may comprise a set of cellular network components, such as AMF(s), SMF(s), UPF(s), and so forth that may be arranged into different network slices which may logically be considered to be separate cellular networks. In one example, different network slices may be preferentially utilized for different types of services. For instance, a first network slice may be utilized for sensor data communications, Internet of Things (IoT), and machine-type communication (MTC), a second network slice may be used for streaming video services, a third network slice may be utilized for voice calling, a fourth network slice may be used for gaming services, and so forth. In accordance with the present disclosure, a network slice may be dedicated to UAV type UEs as described herein.

In one example, SMF 137 may perform endpoint device IP address management, UPF selection, UPF configuration for endpoint device traffic routing to an external packet data network (PDN), charging data collection, quality of service (QOS) enforcement, and so forth. UDM 138 may perform user identification, credential processing, access authorization, registration management, mobility management, subscription management, and so forth. As illustrated in FIG. 1, UDM 138 may be tightly coupled to HSS 133. For instance, UDM 138 and HSS 133 may be co-located on a single host device, or may share a same processing system comprising one or more host devices. In one example, UDM 138 and HSS 133 may comprise interfaces for accessing the same or substantially similar information stored in a database on a same shared device or one or more different devices, such as subscription information, endpoint device capability information, endpoint device location information, and so forth. For instance, in one example, UDM 138 and HSS 133 may both access subscription information or the like that is stored in a unified data repository (UDR) (not shown).

UPF 139 may provide an interconnection point to one or more external packet data networks (PDN(s)) and perform packet routing and forwarding, QoS enforcement, traffic shaping, packet inspection, and so forth. In one example, UPF 139 may also comprise a mobility anchor point for 4G-to-5G and 5G-to-4G session transfers. In this regard, it should be noted that UPF 139 and PGW 134 may provide the same or substantially similar functions, and in one example, may comprise the same device, or may share a same processing system comprising one or more host devices.

It should be noted that other examples may comprise a cellular network with a "non-stand alone" (NSA) mode architecture where 5G radio access network components, such as a "new radio" (NR), "gNodeB" (or "gNB"), and so forth are supported by a 4G/LTE core network (e.g., an EPC network), or a 5G "standalone" (SA) mode point-to-point or service-based architecture where components and functions of an EPC network are replaced by a 5G core network (e.g., an "NC"). For instance, in non-standalone (NSA) mode architecture, LTE radio equipment may continue to be used for cell signaling and management communications, while user data may rely upon a 5G new radio (NR), including millimeter wave communications, for example. However, examples of the present disclosure may also relate to a hybrid, or integrated 4G/LTE-5G cellular core network such as cellular core network 130 illustrated in FIG. 1. In this regard, FIG. 1 illustrates a connection between AMF 135 and MME 131, e.g., an "N26" interface which may convey signaling between AMF 135 and MME 131 relating to endpoint device tracking as endpoint devices are served via 4G or 5G components, respectively, signaling relating to handovers between 4G and 5G components, and so forth.

In one example, service network 140 may comprise one or more devices for providing services to subscribers, customers, and or users. For example, communication service provider network 101 may provide a cloud storage service, web server hosting, and other services. For instance, in one example, service network 140 may provide a cloud storage service for UAV payload data as described herein. As such, service network 140 may represent aspects of communication service provider network 101 where infrastructure for supporting such services may be deployed. In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general. In this regard, it should be noted that any one or more of service network 140, other networks 180, or IMS network 150 may comprise a packet data network (PDN) to which an endpoint device may establish a connection via cellular core network 130 in accordance with the present disclosure.

FIG. 1 further illustrates a ground station 169, e.g., a UAV control system, which may communicate with one or more UAVs, e.g., via communication service provider network 101 and other network(s) 180. For instance, ground station 169 may provide command and control C2 instructions to one or more UAVs, such as UAV 160. In addition, ground station 169 may receive C2 communications from one or more UAVs, such as current position information, speed/velocity, battery status and/or other status indicators, apparent wind speed measurements, LiDAR or similar data, and so forth. In one example, ground station 169 may further receive and/or transmit payload data, such as video or images recorded by one or more UAV cameras, video or images to present via one or more UAV-based screens/displays, etc. In one example, the ground station 169 may comprise a computing device or processing system, such as computing system 400 depicted in FIG. 4, and may be configured to perform operations in connection with various examples as described herein.

In one example, one or more UAVs may be remote controlled by one or more human operators via ground station 169. For instance, ground station 169 may include a display for presenting a video feed from a UAV, may include a joystick or other user interface components for providing control/navigation signals for operating the UAV and so forth. Alternatively, or in addition, ground station 169 may comprise an automated UAV management server/platform. For instance, ground station 169 may provide dispatch and monitoring services with respect to a fleet of one or more UAVs. Thus, for example, ground station 169 may communicate with UAV 160 and/or other UAVs to provide dispatch/pickup locations, destination/drop-off locations, routes, and the like. Similarly, ground station 169 may communicate with UAV 160 and/or other UAVs to monitor battery or fuel reserve, to command UAVs to recharge and/or to refuel, to direct such UAVs to refueling or recharging locations, locations to swap batteries, and so on.

In one example, any one or more of the components of cellular core network 130 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 131 may comprise a vMME, SGW 132 may comprise a vSGW, and so forth. Similarly, AMF 135, NSSF 136, SMF 137, UDM 138, and/or UPF 139 may also comprise NFVI configured to operate as VNFs. In addition, when comprised of various NFVI, the cellular core network 130 may be expanded (or contracted) to include more or less components than the state of cellular core network 130 that is illustrated in FIG. 1. It should be noted that intermediate devices and links between MME 131, SGW 132, cell sites 121-124, PGW 134, AMF 135, NSSF 136, SMF 137, UDM 138, and/or UPF 139, and other components of system 100 are also omitted for clarity, such as additional routers, switches, gateways, and the like.

FIG. 1 also illustrates various endpoint devices, e.g., user equipment (UE) 104 and UAV 160. UE 104 may comprise a cellular telephone, a smartphone, a tablet computing device, a laptop computer, a pair of computing glasses, a wireless enabled wristwatch, a wireless transceiver for a fixed wireless broadband (FWB) deployment, or any other cellular-capable mobile telephony and computing device (broadly, "an endpoint device"). In accordance with the present disclosure, UAV 160 may include at least a camera 162 and one or more radio frequency (RF) transceivers 166 for cellular communications and/or for non-cellular wireless communications. In one example, UAV 160 may also include a module 164 with one or more additional controllable components, such as a microphone, an infrared, ultraviolet or visible spectrum light source, a display, a loudspeaker, and so forth. In one example, UAV 160 may be equipped with one or more directional antennas, or antenna arrays (e.g., having a half-power azimuthal beamwidth of 120 degrees or less, 90 degrees or less, 60 degrees or less, etc.), e.g., MIMO antenna(s) to receive and/or to transmit multi-path and/or spatial diversity signals. UAV 160 may also include a gyroscope and compass to determine orientation(s), a global positioning system (GPS) receiver for determining a location (e.g., in latitude and longitude, or the like), and so forth. In one example, UAV 160 may also be configured to determine location/position from near field communication (NFC) technologies, such as Wi-Fi direct and/or other IEEE 802.11 communications or sensing (e.g., in relation to beacons or reference points in an environment), IEEE 802.15 based communications or sensing (e.g., "Bluetooth", "ZigBee", etc.), and so forth. It should be noted that UE 104 may be similarly equipped, e.g., with MIMO antenna(s), GPS receiver, etc.

Figure 4:
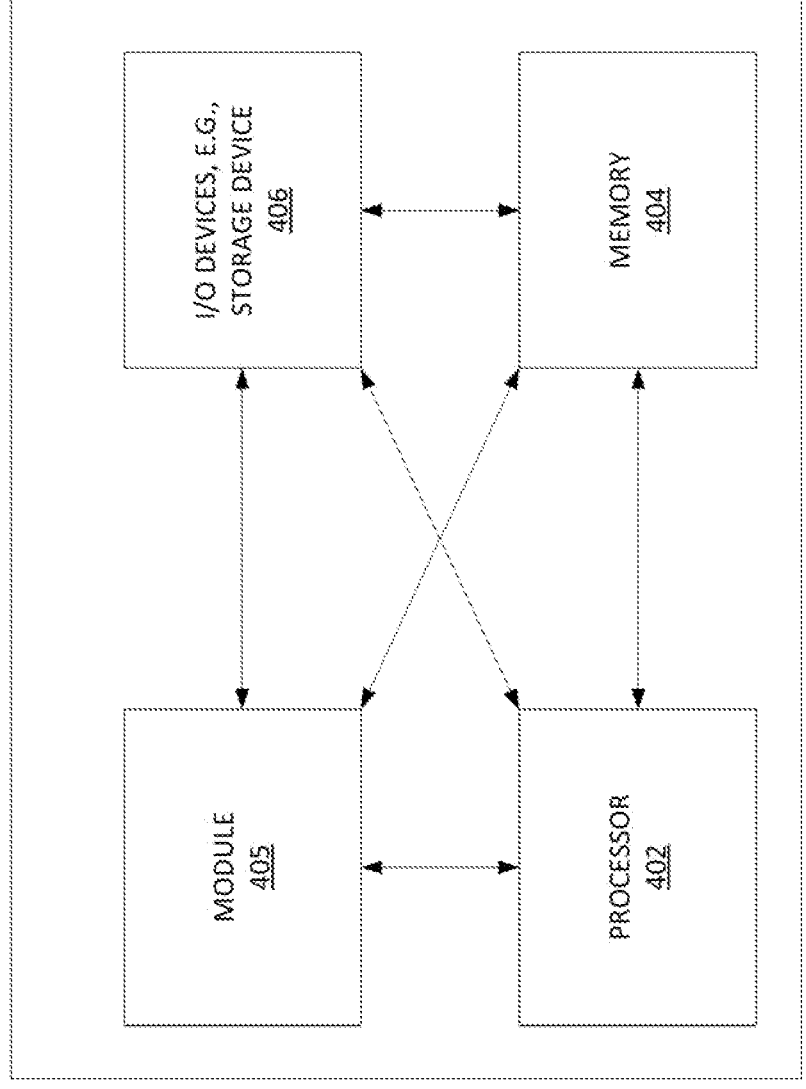
FIG. 4 illustrates a high level block diagram of a computing device specifically programmed to perform the steps, functions, blocks and/or operations described herein.

In one example, UAV 160 may comprise all or a portion of a computing system, such as computing system 400 depicted in FIG. 4, and may be configured to perform steps, functions, and/or operations in connection with examples of the present disclosure for assigning at least a first portion of data traffic of an uncrewed aerial vehicle comprising command and control traffic to a primary cell of the cellular network that is selected based on the primary cell having a largest coverage range for the uncrewed aerial vehicle as compared to other available cells. In this regard, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

As illustrated in FIG. 1, UE 104 may access wireless services via the cell site 121 (e.g., NR alone, where cell site 121 comprises a gNB), while UAV 160 may access wireless services via any of the cell sites 121-124 located in the access network 120 (e.g., for NR non-dual connectivity, for LTE non-dual connectivity, for NR-NR DC, for LTE-LTE DC, for EN-DC, and/or for NE-DC). For instance, in one example, UAV 160 may establish and maintain connections to the cellular core network 130 via multiple gNBs (e.g., cell sites 121 and 122 and/or cell sites 121 and 122 in conjunction with BBU pool 126 and/or various other components, such as a CU and/or a DU). In another example, UAV 160 may establish and maintain connections to the cellular core network 130 via a gNB (e.g., cell site 122 and/or cell site 122 in conjunction with BBU pool 126) and an eNodeB (e.g., cell site 124), respectively. In addition, either the gNB or the eNodeB may comprise a PCell, and the other may comprise a SCell for carrier aggregation and/or dual connectivity, as described herein. Similarly, UAV 160 may communicate with any of the cell sites 121 and 122 using carrier aggregation (CA) (e.g., in accordance with a CA technique). Furthermore, either or both of NR/5G and or EPC (4G/LTE) core network components may manage the communications between UAV 160 and the cellular network 110 via cell site 122 and cell site 124.

In one example, UAV 160 may also utilize different antenna arrays for 4G/LTE and 5G/NR, respectively. For instance, 5G antenna arrays may be arranged for beamforming in a frequency band designated for 5G high data rate communications. For instance, the antenna array for 5G may be designed for operation in a frequency band greater than 5 GHZ. In one example, the array for 5G may be designed for operation in a frequency band greater than 20 GHz. In contrast, an antenna array for 4G may be designed for operation in a frequency band less than 5 GHZ, e.g., 500 MHz to 3 GHZ. In addition, in one example, the 4G antenna array (and/or the RF or baseband processing components associated therewith) may not be configured for and/or be capable of beamforming. Accordingly, in one example, UAV 160 may turn off a 4G/LTE radio, and may activate a 5G radio to send a request to activate a 5G session to cell site 122 (e.g., when it is chosen to operate in a non-DC mode or an intra-RAT dual connectivity mode), or may maintain both radios in an active state for multi-radio (MR) dual connectivity (MR-DC).

In accordance with the present disclosure, UAV 160 may be attached to any cell site of access network 120 and may provide capability information (e.g., at least including carrier aggregation capability information) to the cellular network 110. The cellular network 110 may then select a primary cell to serve UAV 160 from among cells within communication range of UAV 160. For instance, the cellular network 110 may select a PCell as an available cell within the largest coverage range for UAV 160 as compared to other available cells. In one example, the coverage range may be calculated/estimated based on a trajectory of UAV 160. For instance, the cell site to which UAV 160 is attached may track position information of UAV 160 from which a trajectory may be calculated and/or predicted. In one example, the coverage range of a cell for UAV 160 may be calculated from the trajectory of the UAV 160 and a communication zone of the cell. For instance, the communication zone may be a three dimensional area akin to a cell "footprint." In one example, the communication zone may be determined via channel sounding measurements and/or UE reporting. In addition, in one example, data identifying the communication zones for various cells may be stored in cellular network 110, such as at a network repository function (NRF) (not shown) and made accessible for calculating/estimating a UAV coverage range as described herein.

After the PCell is selected, the cellular network 110 may then transmit at least one instruction to assign at least a portion of the data traffic of UAV 160 to the selected PCell (e.g., at least the command and control traffic). In one example, the cellular network may further select an available cell having a largest bandwidth, e.g., a secondary cell (SCell) of the cellular network to serve UAV 160. In addition, cellular network 110 may allocate at least a second portion of the data traffic of UAV 160 to the SCell (e.g., comprising payload data of the uncrewed aerial vehicle). In one example, the allocating may be via the same instruction as for an assignment/allocation of the PCell, or may be via a different instruction (at a same time or at a later time). Additional operations in connection with examples of the present disclosure for assigning at least a first portion of data traffic of an uncrewed aerial vehicle comprising command and control traffic to a primary cell of the cellular network that is selected based on the primary cell having a largest coverage range for the uncrewed aerial vehicle as compared to other available cells are described in greater detail below in connection with the examples of FIGS. 2 and 3.

In addition, in various examples, UAV 160 may measure and report to cell sites a signal to noise ratio (SNR, or SINR). For instance, UAV 160 may receive a channel state information (CSI) reference signal from cell site 121, cell site 122, or the like. In addition, UAV 160 may measure the SNR and may report the measurement to the cellular network 110 (e.g., reporting to the cell site that transmitted the reference signal, or to a different cell site). In one example UAV 160 may alternatively or additionally measure and report throughput, e.g., on a dedicated or primary data radio bearer, on a secondary data radio bearer, etc. In one example, the UAV 160 may transmit SINR and/or throughput measurements as messages via a DCCH logical channel over a signaling resource bearer (SRB), such as SRB 1 and/or SRB 3. For instance, the message(s) may be transmitted to one of the cell sites 121-124 to which the UAV 160 maintains an RRC connected state. UAV 160 may further receive and implement instructions from the cellular network 110 regarding whether to utilize carrier aggregation, the particular component carriers to utilize, the PCell and any SCell(s), a transmission power level/class etc., whether to utilize an OFDM waveform or DFT waveform, a modulation coding scheme to utilize, and so forth.

It should be noted that examples of the present disclosure as described herein primarily in connection with steps, functions, and/or operations are performed by a processing system in cellular core network 130, such as application server (AS) 195, AMF 135, SMF 137, MME 131, or the like. For instance, FIG. 3 illustrates a flowchart of an example method that may be performed by a cellular core network component for assigning at least a first portion of data traffic of an uncrewed aerial vehicle comprising command and control traffic to a primary cell of the cellular network that is selected based on the primary cell having a largest coverage range for the uncrewed aerial vehicle as compared to other available cells. However, in other, further, and different examples, various steps, functions, and/or operations as described in connection with FIG. 3, or as described elsewhere herein, may alternatively or additionally be performed by one or more other components. For instance, various steps, functions, and/or operations may alternatively or additionally be performed by a base station (and/or any one or more components thereof). To illustrate, in an example in which the foregoing is performed by a base station/cell site, the transmitting of the at least one instruction may be via the base station/cell site to UAV 160. However, in an example in which the foregoing may be performed by AS 195, AMF 135, SMF 137, MME 131, or the like, the instruction may be to one or more cell sites/base stations to further establish services as a PCell and/or SCell, respectively, to serve UAV 160.

The foregoing description of the system 100 is provided as an illustrative example only. In other words, the example of system 100 is merely illustrative of one network configuration that is suitable for implementing examples of the present disclosure. As such, other logical and/or physical arrangements for the system 100 may be implemented in accordance with the present disclosure. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For instance, in one example, the cellular core network 130 may further include a Diameter routing agent (DRA) which may be engaged in the proper routing of messages between other elements within cellular core network 130, and with other components of the system 100, such as a call session control function (CSCF) (not shown) in IMS network 150. In another example, the NSSF 136 may be integrated within the AMF 135. In addition, cellular core network 130 may also include additional 5G NG core components, such as: a policy control function (PCF), an authentication server function (AUSF), a network repository function (NRF), and other application functions (AFs). In one example, any one or more of cell sites 121-123 may comprise 2G, 3G, 4G and/or LTE radios, e.g., in addition to 5G new radio (NR), or gNB functionality. For instance, cell site 123 is illustrated as being in communication with AMF 135 in addition to MME 131 and SGW 132. Thus, these and other modifications are all contemplated within the scope of the present disclosure.

Figure 2:
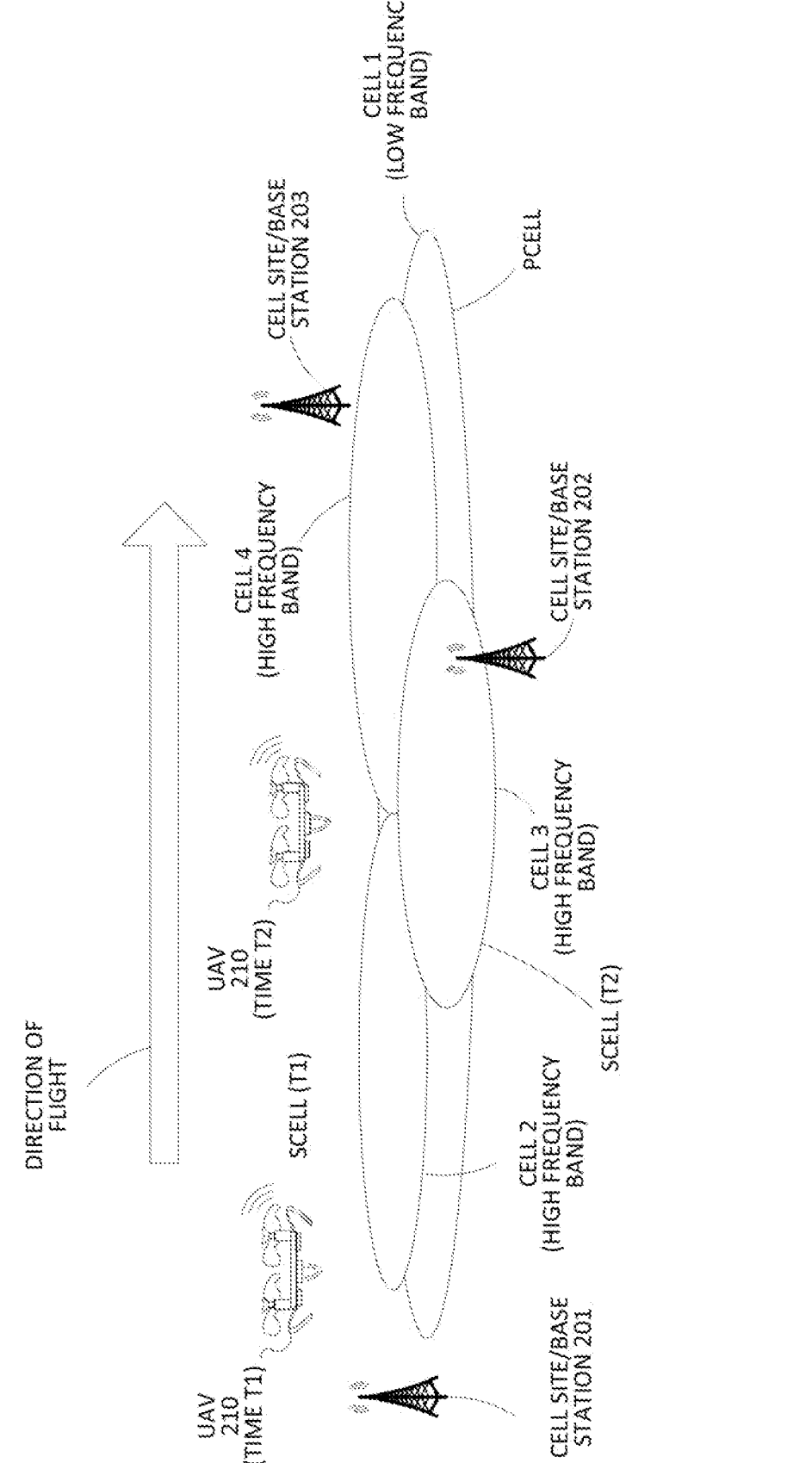
FIG. 2 illustrates an example region of a cellular network having a plurality of cells provided by cell sites/base stations.

To aid in understanding the present disclosure, FIG. 2 illustrates an example region 200 of a cellular network having a plurality of cells (e.g., cells 1-4) provided by cell sites/base stations 201-203 (e.g., gNBs and/or eNodeBs or the like). For instance, cell 1 and cell 2 may be provided via cell site/base station 201, cell 3 may be provided via cell site/base station 202 and cell 4 may be provided via cell site/base station 203. In the example of FIG. 2, cell 1 may be associated with a low frequency band (e.g., 800 MHz or the like), while cells 2-4 may be associated with a mid or high frequency band (e.g., 1.6 GHZ, 5 GHZ, or the like).

A UAV 210 may report supported carrier aggregation (CA) band combinations to a cell site in a UECapabilityInformation message in response to a received UECapabilityEnquiry. In one illustrative example, UAV 210 may select to attach to a cell with the highest received signal strength, for example. Thus, for instance, if only cell 1 and cell 2 are within communication range of UAV 210, since cell 2 is of higher frequency (and hence likely having a greater bandwidth availability), UAV 210 may attach to cell 2 as a primary cell. In addition, UAV 210 may scan neighboring cells and report to the primary cell: the capabilities of UAV 210 and received signal strength of the neighboring cells. The PCell may then select an SCell for UAV 210 based on the capabilities of UAV 210 (e.g., frequency band(s) of operation), the received signal strength measurements reported, and a frequency priority among the available SCells. The PCell may then add selected component carriers as one or more SCells for UAV 210 and instruct UAV 210 accordingly. UAV 210 may then connect to the SCell(s) in accordance with the designated component carrier(s) and data traffic may be split between the Pcell and Scell(s). However, in this case, as UAV 210 may move to the right (as indicated by the position of UAV 210 at time T2 and the direction of the arrow in FIG. 2), there may be multiple handovers of the primary cell from cell 2 to cell 3, and then from cell 3 to cell 4. In addition, cell 1 will always be selected as an Scell while UAV 210 is traveling in the region 200.

In contrast to the above example, in accordance with the present disclosure, by choosing a cell using a low frequency band as a primary cell, UAV 210 may be assured to have less handover events for command and control (C2) traffic than in the case above. For instance, since the coverage of cell 1, using a low frequency band, is relatively larger than cell 2, UAV 210 may travel a much further distance (e.g., in the direction of flight indicated by the arrow in FIG. 2) without C2 traffic being interrupted for a handover event. While UAV 210 may engage in SCell reselection from cell 2 to cell 3, and from cell 3 to cell 4, the SCell(s) is/are used for payload data traffic and hence may be tolerant to some packet delay and/or packet loss. It should be noted that an SCell may be associated with a different cell site/base station than the PCell. Thus, for example, at time T2, cell 1 provided via cell site/base station 201 may still serve as a PCell for UAV 210, while cell 3, provided via cell site/base station 202 may serve as an SCell, and similarly at a later time for cell 4 provided via cell site/base station 203.

To further illustrate, in accordance with the present disclosure, the UAV 210 may initially be attached to a cell in the network. This may be cell 2, or another high band cell and/or a cell having a highest RSS. However, UAV 210 may indicate a UE type of "aerial UE," "UAV," or the like, in response to which the cellular network may then select a PCell for C2 traffic in accordance with the present disclosure. Accordingly, in the example of FIG. 2, UAV 210 may be handed-over to cell 1 (e.g., provided via cell site/base station 201) as a PCell. In addition, UAV 210 may report supported carrier aggregation (CA) band combinations, e.g., in a UECapabilityInformation message in response to receiving a UECapabilityEnquiry from cell site/base station 201 via cell 1. In addition, UAV 210 may scan neighboring cells and report to cell site/base station 201 via the primary cell (cell 1): the capabilities of UAV 210 and received signal strength of the neighboring cells. In accordance with the present disclosure, the cell site/base station 201 (or a network component behind the cell site/base station 201, such as SMF 137, MME 131, AMF 135, AS 195, or the like) may then select an SCell for UAV 210 based on the capabilities of UAV 210 (e.g., frequency band(s) of operation), the received signal strength measurements reported, a frequency priority among the available SCells, and/or other factors, and may instruct UAV 210 accordingly. In one example, cell site/base station 201 or other network-based components may refer to a network repository function (NRF) or the like to obtain communication ranges (e.g., 3D "footprints") and/or other information regarding candidate cells, e.g., candidate component carriers for carrier aggregation. In addition, such an entity may further obtain trajectory information regarding UAV 210 to calculate/estimate coverage ranges of different cells for UAV 210. For instance, a coverage range may be estimated based on an intersection of a trajectory of UAV 210 and the communication range of a respective candidate cell.

It should be noted that the example of FIG. 2 is representative in nature and that other, further, and different examples may include more or less cells for consideration as candidate primary cells and/or secondary cells in various frequency bands. In addition, while two-dimensional representation of cell bounds are illustrated in FIG. 2, it should be understood that insofar as the present disclosure relates to UAVs/aerial UEs, a "cell" may have a three-dimensional communication range. In addition, a cell communication range may not be spherical or half-spherical, but may have an undefined three dimensional shape with directionality based upon sidelobes of antenna radiation patterns, the frequency band of operation, a transmit power, etc.

FIG. 3 illustrates a flowchart of an example method 300 for assigning at least a first portion of data traffic of an uncrewed aerial vehicle comprising command and control traffic to a primary cell of the cellular network that is selected based on the primary cell having a largest coverage range for the uncrewed aerial vehicle as compared to other available cells, in accordance with the present disclosure. In one example, steps, functions and/or operations of the method 300 may be performed by a device as illustrated in FIG. 1, e.g., any of AS 195, SMF 137, MME 131, NSSF 136, AMF 135, and so forth, or cell sites 121-124 and/or BBU pool 126 (e.g., including a CU and/or a DU, or the like), or any one or more components thereof, such as a processing system, or collectively via a plurality devices in FIG. 1, such as any one or more of AS 195, SMF 137, MME 131, NSSF 136, AMF 135, or cell sites 121-124 in conjunction with another of such components, or one or more other entities, such a network repository function, and so forth. In one example, the steps, functions, or operations of method 300 may be performed by a computing device or system 400, and/or a processing system 402 as described in connection with FIG. 4 below. Similarly, in one example, the steps, functions, or operations of method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processing system, such as processing system 402. The method 300 begins in step 305 and may proceed to optional step 310 or to step 320.

At optional step 310, the processing system may obtain an identification of an uncrewed aerial vehicle (UAV) and an indicator of a UAV user equipment type (e.g., an indicator that distinguishes from other UE types that are not UAVs). In one example, the identification of the UAV and the indicator of the UAV UE type may be obtained as part of a network attach procedure. In this regard, it should be noted that the UAV may include at least one cellular radio for communication with the cellular network.

At step 320, the processing system detects capability information of the UAV, where the capability information includes carrier aggregation capability information. In one example, the detecting of the capability information of the UAV is performed in response to the obtaining of the indicator of the UAV UE type.

At optional step 330, the processing system may obtain, from the UAV, identifications of a plurality of cells within communication range of the UAV. In one example, optional step 330 may further include obtaining respective signal strength information for each of the plurality of cells.

At step 340, the processing system selects, in accordance with the CA capability information of the UAV, a primary cell (PCell) of the cellular network to serve the UAV. In particular, step 340 may include selecting the primary cell from among a plurality of cells within communication range of the UAV based on the primary cell having a largest coverage range for the UAV as compared to other cells of the plurality of cells. In one example, the coverage range may be calculated in accordance with a communication range of the primary cell and a trajectory of the UAV. For instance, the coverage range may be an intersection of cell geometry (which may be influenced by the transmit power) and trajectory/anticipated path of the UAV. To illustrate, the trajectory may be estimated from a location sequence of the UAV. In one example, the location sequence may be obtained from at least one of: reference signal positioning estimates or location reporting from the UAV. For example, the reference signal positioning estimates may comprise sounding reference signal (SRS) location estimates for positioning in the uplink and/or downlink positioning reference signal (PRS) location estimates for positioning in the downlink, or the like. For example, the processing system may monitor location/position information of the UAV for a short period of time, from which a trajectory may be calculated.

Alternatively, or in addition, another network component may temporarily track and/or store location information of the UAV (e.g., in one example, subject to the opt-in of an owner/operator of the UAV for the benefit of enhanced cellular service in accordance with the present disclosure). Alternatively, or in addition, the UAV may determine its own position using GPS/GNSS, and may report locations to the processing system via a cell site/base station to which the UAV is currently attached (which may comprise the same primary cell that is selected at step 340, or a different cell site/base station).

In one example, the primary cell may further be selected in accordance with at least one signal strength measure associated with at least one reference signal between the uncrewed aerial vehicle and the primary cell (e.g., a reference signal received power, a signal to noise ratio, or the like). In one example, the processing system may utilize signal to noise ratios from two or more types of reference signals (or a composite metric in accordance with a formula or weightings based on the constituent SNRs). For instance, a metric may be based on a combination of a channel state information reference signal CSI-RS SNR and a SNR from a demodulation reference signal (DMRS) or sounding reference signal (SRS). In one example, the primary cell may be selected from among a plurality of cells within communication range of the UAV, where the largest coverage range of the primary cell for the UAV is a largest scaled coverage range comprising a coverage range scaled by a respective signal strength associated with the UAV and the primary cell. In one example, the selection of the primary cell may be further based on a frequency band of the primary cell being a lower frequency band as compared to other cells of the plurality of cells. For instance, the communication range of the primary cell may be estimated based on the frequency (where lower frequency generally corresponds to larger communication range that a higher frequency, given a same transmit and/or receive power level). In other words, the selection may be based on a frequency priority of the primary cell (e.g., lower frequency and hence higher coverage preferred, unless a higher frequency cell may be configured to use more power to provide a greater coverage), as long as within the UAV cellular radio capabilities.

At optional step 350, the processing system may select a secondary cell (SCell) of the cellular network to serve the UAV. In one example, the secondary cell is selected from among the plurality of cells having a largest available bandwidth as compared to other cells of the plurality of cells. For instance, in one example, the second cell is selected from among the plurality of cells within communication range of the UAV based on a frequency band of the secondary cell being a higher frequency band as compared to other cells of the plurality of cells. In other words, frequency priority for selecting a secondary cell may be the reverse of a frequency priority for selecting a primary cell. Alternatively, or in addition, the processing system may not consider the frequency band of the secondary cell. However, in consideration of the bandwidth, the result may be the selection of the secondary cell having a higher frequency band as compared to the primary cell. Similar to the above, in one example, the secondary cell may be further selected from among the plurality of cells having a largest bandwidth as compared to other cells of the plurality of cells scaled by a coverage range of the secondary cell for the UAV (e.g., where the coverage range may be calculated/estimated as described above).

At step 360, the processing system transmits at least a first instruction to assign at least a first portion of data traffic of the UAV to the primary cell, where the at least the first portion of the data traffic comprises command and control traffic of the UAV. In other words, the processing system assigns the at least a first portion of the data traffic of the UAV to the primary cell of that is selected based on the primary cell having a largest coverage range for the UAV as compared to other available cells. In one example, the at least the first instruction may be to a cell site/base station from the processing system (e.g., in an example in which the processing system comprises a network-based component, such as an application server, an SMF, an MME 131 etc.). In one example, the at least the first instruction may be further to the UAV (e.g., from and/or via a cell site/base station to which the UAV is currently attached). In accordance with the present disclosure, the command and control traffic data may have a higher priority, and more stringent packet delay and packet drop requirements compared to payload data traffic data of the UAV. Notably, the mapping of command and control traffic data to the primary cell is aimed to reduce the frequency of handover transitions of the command and control traffic data of the UAV, while the UAV traverses the network.

At optional step 370, the processing system may allocate at least a second portion of the data traffic of the UAV to the secondary cell (e.g., that may be selected at optional step 350). For instance, the allocating may be via at least a second instruction to a cell site/base station providing the secondary cell (which may be the same or different from a base station/cell site providing the primary cell). Similarly, in one example, the at least the second instruction may alternatively or additionally include an instruction to the UAV, e.g., via the primary cell, or another serving cell to which the UAV is attached prior to a handover to the primary cell selected at step 340. In accordance with the present disclosure, the at least the second portion of the data traffic may comprise a payload data traffic of the UAV. For instance, in one example, the payload data/payload data traffic may comprise image data captured by the UAV, e.g., video, digital photographs, LiDAR images, etc. In another example, the payload data may alternatively or additionally comprise sensor data, such as magnetic field sensor readings from a sensor array, sound data from a microphone or acoustic array, etc. In one example, the payload data may alternatively or additionally include data transmitted to the UAV, such as video to present on a screen, audio to present via one or more speakers, etc.

At optional step 380, the processing system may detect an additional cell having a pilot signal power that exceeds a pilot signal power of the secondary cell. For instance, the UAV may continue to periodically report on cells that are detectable by the UAV, e.g., along with signal strength measurements, etc. In one example, optional step 380 may comprise detecting that the additional cell has a pilot signal power that exceeds the pilot signal of the secondary cell by a threshold amount (e.g., to avoid excessive bouncing between secondary cells, which may be a more significant issue with regard to aerial UEs, which may see even more available cells than ground-based UEs). In one example, optional step 380 may comprise detecting that the additional cell has a bandwidth that exceeds the bandwidth of the secondary cell by a threshold amount. In one example, optional step 380 may also include detecting that a signal to noise ratio associated with the additional cell for the UAV exceeds a threshold.

At optional step 390, the processing system may initiate a handover from the secondary cell to the additional cell as a new secondary cell, in response to the detecting. For instance, optional step 390 may include at least one additional instruction (e.g., to the secondary cell, to the new secondary cell, and/or to the UAV). In one example, the handover may be initiated further in response to determining that a coverage range of the new secondary cell exceeds a remaining anticipated coverage range of the current secondary cell (e.g., based on the trajectory of the UAV).

Following step 360 or one of optional steps 370-390, the method 300 may proceed to step 395 where the method 300 ends.

It should be noted that the method 300 may be expanded to include additional steps or may be modified to include additional operations or omit operations with respect to the steps outlined above. For instance, in one example, the method 300 may further include selecting a new primary cell and initiating a handover to the new primary cell when: the new primary cell has a higher or same frequency priority as the existing primary cell, a calculated coverage range of the new primary cell exceeds the remaining range of the existing primary cell (or exceeds by a threshold distance/range), and when at least one signal strength measure associated with at least one reference signal between the uncrewed aerial vehicle and the new primary cell exceeds that of the existing primary cell (or exceeds by a threshold amount). It should be noted that in such an example, the new primary cell may be selected from among available cells within the UAV supported frequency band(s). In one example, step 340 may further include selecting a primary cell as a cell with a greatest coverage range modified/supplemented with frequency priority. For example, one cell may have greater range, but may be lower in list of preferred frequencies/frequency bands. In one example, frequency bands may be more crowded or less crowded, affecting which frequencies may be preferred. For instance, in one example, this may be updated within SON functionality. In one example, the method 300 may be repeated through various cycles of steps 330-360 and/or steps 330-390 to select new primary cells and/or new secondary cells as the UAV moves throughout a region. In one example, the method 300 may further include tracking location information of the UAV as described above. Alternatively, optional step 350 may follow step 360, step 330 may be repeated following step 360 and prior to optional step 350, and so forth. In one example, the method 300 may be expanded or modified to include steps, functions, and/or operations, or other features described in connection with the example(s) of FIGS. 1, 2, and/or 4, or as described elsewhere herein. Thus, these and other modifications are all contemplated within the scope of the present disclosure.

In addition, although not specifically specified, one or more steps, functions, or operations of the example method 300 may include a storing, displaying, and/or outputting step as required for a particular application. In other words, any data, records, fields, and/or intermediate results discussed in the method(s) can be stored, displayed, and/or outputted either on the device executing the method or to another device, as required for a particular application. Furthermore, steps, blocks, functions or operations in FIG. 3 that recite a determining operation or involve a decision do not necessarily require that both branches of the determining operation be practiced. In other words, one of the branches of the determining operation can be deemed as an optional step. Furthermore, steps, blocks, functions or operations of the above described method(s) can be combined, separated, and/or performed in a different order from that described above, without departing from the examples of the present disclosure.

FIG. 4 depicts a high-level block diagram of a computing device or processing system specifically programmed to perform the functions described herein. For example, any one or more components or devices illustrated in FIG. 1, or described in connection with the examples of FIGS. 2 and 3, respectively, may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for assigning at least a first portion of data traffic of an uncrewed aerial vehicle comprising command and control traffic to a primary cell of the cellular network that is selected based on the primary cell having a largest coverage range for the uncrewed aerial vehicle as compared to other available cells, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like). In accordance with the present disclosure input/output devices 406 may also include antenna elements, antenna arrays, remote radio heads (RRHs), baseband units (BBUs), transceivers, power units, and so forth.

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for assigning at least a first portion of data traffic of an uncrewed aerial vehicle comprising command and control traffic to a primary cell of the cellular network that is selected based on the primary cell having a largest coverage range for the uncrewed aerial vehicle as compared to other available cells (e.g., a software program comprising computer-executable instructions) can be loaded into memory 404 and executed by hardware processor element 402 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for assigning at least a first portion of data traffic of an uncrewed aerial vehicle comprising command and control traffic to a primary cell of the cellular network that is selected based on the primary cell having a largest coverage range for the uncrewed aerial vehicle as compared to other available cells (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:

detecting, by a processing system including at least one processor deployed in a cellular network, capability information of an uncrewed aerial vehicle, wherein the capability information includes carrier aggregation capability information, wherein the uncrewed aerial vehicle includes at least one cellular radio for communication with the cellular network;

selecting, by the processing system in accordance with the carrier aggregation capability information of the uncrewed aerial vehicle, a primary cell of the cellular network to serve the uncrewed aerial vehicle, wherein the selecting comprises selecting the primary cell from among a plurality of cells within a communication range of the uncrewed aerial vehicle based on the primary cell having a largest coverage range for the uncrewed aerial vehicle as compared to other cells of the plurality of cells; and transmitting, by the processing system, at least a first instruction to assign at least a first portion of data traffic of the uncrewed aerial vehicle to the primary cell, wherein the at least the first portion of the data traffic comprises command and control traffic of the uncrewed aerial vehicle.

2. The method of claim 1, wherein the coverage range is calculated in accordance with a communication range of the primary cell and a trajectory of the uncrewed aerial vehicle.

3. The method of claim 2, wherein the trajectory is estimated from a location sequence of the uncrewed aerial vehicle.

4. The method of claim 3, wherein the location sequence is obtained from at least one of: reference signal positioning estimates or a location reporting from the uncrewed aerial vehicle.

5. The method of claim 1, wherein the primary cell is selected based on a frequency band of the primary cell being a lower frequency band as compared to other cells of the plurality of cells.

6. The method of claim 1, further comprising:
selecting a secondary cell of the cellular network to serve the uncrewed aerial vehicle.

7. The method of claim 6, wherein the secondary cell is selected from among the plurality of cells having a largest bandwidth as compared to other cells of the plurality of cells.

8. The method of claim 7, wherein the secondary cell is selected from among the plurality of cells having a largest bandwidth as compared to other cells of the plurality of cells scaled by a coverage range of the secondary cell for the uncrewed aerial vehicle.

9. The method of claim 8, further comprising:
detecting an additional cell having a pilot signal power that exceeds a pilot signal power of the secondary cell; and
initiating a handover from the secondary cell to the additional cell as a new secondary cell, in response to the detecting the additional cell having the pilot signal power that exceeds the pilot signal power of the secondary cell.

10. The method of claim 6, further comprising:
allocating at least a second portion of the data traffic of the uncrewed aerial vehicle to the secondary cell.

11. The method of claim 10, wherein the at least the second portion of the data traffic comprises payload data traffic of the uncrewed aerial vehicle.

12. The method of claim 1, further comprising:
obtaining an identification of the uncrewed aerial vehicle and an indicator of an uncrewed aerial vehicle user equipment type.

13. The method of claim 12, wherein the detecting of the capability information of the uncrewed aerial vehicle is performed in response to the obtaining of the indicator of the uncrewed aerial vehicle user equipment type.

14. The method of claim 1, further comprising:
obtaining, from the uncrewed aerial vehicle, identifications of the plurality of cells within the communication range of the uncrewed aerial vehicle.

15. The method of claim 14, wherein the primary cell is further selected in accordance with at least one signal strength measure associated with at least one reference signal between the uncrewed aerial vehicle and the primary cell.

16. The method of claim 15, wherein the obtaining of the identifications of the plurality of cells further comprises:
obtaining respective signal strength information for each of the plurality of cells.

17. A non-transitory computer-readable medium storing instructions which, when executed by a processing system including at least one processor deployed in a cellular network, cause the processing system to perform operations, the operations comprising:

detecting capability information of an uncrewed aerial vehicle, wherein the capability information includes carrier aggregation capability information, wherein the uncrewed aerial vehicle includes at least one cellular radio for communication with the cellular network;
selecting, in accordance with the carrier aggregation capability information of the uncrewed aerial vehicle, a primary cell of the cellular network to serve the uncrewed aerial vehicle, wherein the selecting comprises selecting the primary cell from among a plurality of cells within a communication range of the uncrewed aerial vehicle based on the primary cell having a largest coverage range for the uncrewed aerial vehicle as compared to other cells of the plurality of cells; and
transmitting at least a first instruction to assign at least a first portion of data traffic of the uncrewed aerial vehicle to the primary cell, wherein the at least the first portion of the data traffic comprises command and control traffic of the uncrewed aerial vehicle.

18. The non-transitory computer-readable medium of claim 17, wherein the operations further comprise:
selecting a secondary cell of the cellular network to serve the uncrewed aerial vehicle, wherein the selecting of the secondary cell comprises selecting the secondary cell from among the plurality of cells within a communication range of the uncrewed aerial vehicle based on the secondary cell having a largest available bandwidth for the uncrewed aerial vehicle as compared to other cells of the plurality of cells; and
transmitting at least a second instruction to assign at least a second portion of data traffic of the uncrewed aerial vehicle to the secondary cell, wherein the at least the second portion of the data traffic comprises payload data traffic of the uncrewed aerial vehicle.

19. An apparatus comprising:
a processing system including at least one processor; and
a non-transitory computer-readable medium storing instructions which, when executed by the processing system when deployed in a cellular network, cause the processing system to perform operations, the operations comprising:
detecting capability information of an uncrewed aerial vehicle, wherein the capability information includes carrier aggregation capability information, wherein the uncrewed aerial vehicle includes at least one cellular radio for communication with the cellular network;
selecting, in accordance with the carrier aggregation capability information of the uncrewed aerial vehicle, a primary cell of the cellular network to serve the uncrewed aerial vehicle, wherein the selecting comprises selecting the primary cell from among a plurality of cells within a communication range of the uncrewed aerial vehicle based on the primary cell having a largest coverage range for the uncrewed aerial vehicle as compared to other cells of the plurality of cells; and
transmitting at least a first instruction to assign at least a first portion of data traffic of the uncrewed aerial vehicle to the primary cell, wherein the at least the first portion of the data traffic comprises command and control traffic of the uncrewed aerial vehicle.

20. The apparatus of claim 19, wherein the operations further comprise:
selecting a secondary cell of the cellular network to serve the uncrewed aerial vehicle, wherein the selecting of the secondary cell comprises selecting the secondary cell from among the plurality of cells within a communication range of the uncrewed aerial vehicle based on the secondary cell having a largest available bandwidth for the uncrewed aerial vehicle as compared to other cells of the plurality of cells; and transmitting at least a second instruction to assign at least a second portion of data traffic of the uncrewed aerial vehicle to the secondary cell, wherein the at least the second portion of the data traffic comprises payload data traffic of the uncrewed aerial vehicle.

\* \* \* \* \*